Feb. 3, 1931.  C. LARSON  1,790,989

CALIPER

Filed Jan. 8, 1929

Inventor:-
Charles Larson

Attorneys

Patented Feb. 3, 1931

1,790,989

UNITED STATES PATENT OFFICE

CHARLES LARSON, OF CHICAGO, ILLINOIS

CALIPER

Application filed January 8, 1929. Serial No. 331,039.

My invention relates to the conventional type of calipers as used in shops and laboratories, and has for its main object to construct a caliper of this kind with an improved design embodying a novel measuring scale.

A further object of my invention is to construct the novel caliper with an extended shank design to serve both as a handle and as a base for the measuring element.

A still further object of my invention is to incorporate in the novel caliper a rest for the measuring scale, which renders the same stable during the movements of the caliper.

Another object of my invention is to design the handle of the caliper with a peculiar pointer which is of an integral nature with the same.

A final, but nevertheless important object of the invention is to design the structure with the utmost simplicity and ruggedness, so that it may be manufactured at low cost and constitute a handy and durable implement for the mechanic.

With the above objects in view and any others that may suggest themselves from the specification and claims to follow, a better understanding of the invention may be gained by reference to the accompanying drawing, in which—

Figure 1:
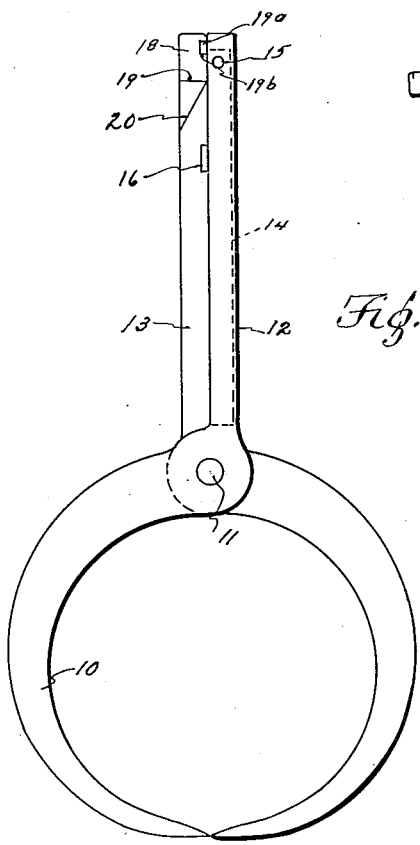
Figure 1 is an elevation of the novel caliper in closed position.

As is well known, the conventional caliper is formed with a pair of legs extending from a terminal pivot and diverging to form curved jaws between which the object to be measured is disposed. For the function of my improvement, I find it advisable to construct the caliper with a medial pivot, to resemble a pair of ice tongs in a degree. By specific reference to the drawing, 10 denotes the jaws, 11 the pivot therefor, and 12 and 13 the handle extension or shank for each of the jaws. These extensions are of an elongated nature, which enables the extension 12 to receive along one side a measuring scale 14, which is pivoted at 15 near the outer end of the extension. The pivot is semi-tight, so that the scale may be swung out readily but will not swing loosely.

The extension 13, which by the superposition of the jaws is offset or staggered with reference to the extension 12, is provided with a lug 16 which forms an abutment when the extensions are closed to prevent the extensions 12 from passing or crossing the extension 13.

Figure 4:
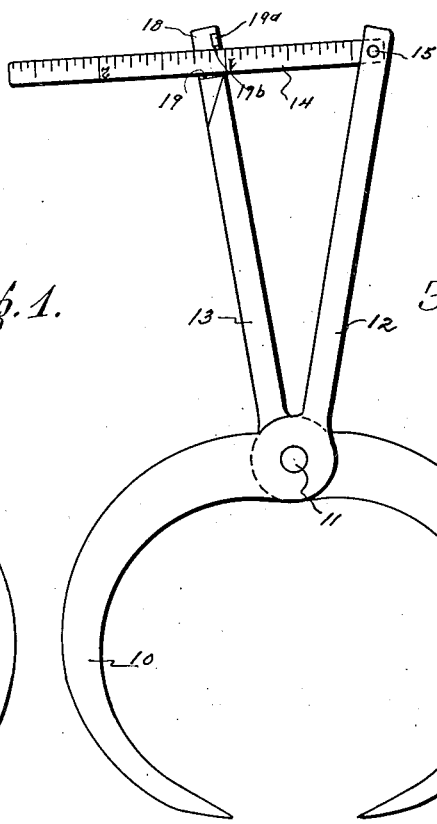
Fig. 4 is an elevation showing the caliper opened and in position to measure.
Figure 2:
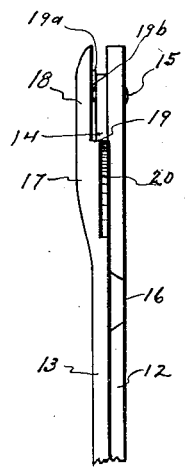
Fig. 2 is an enlarged edge view of the upper part from the left.
Figure 3:
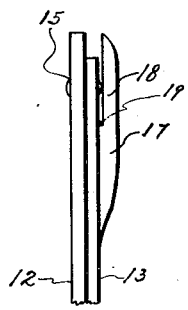
Fig. 3 is an enlarged edge view of the same from the right.

Beyond the lug 16, the extension 13 is thickened as indicated at 17 and reduced with an offset 18 defining a shelf 19, which forms a rest when the scale is swung over to assume a transverse position upon the shelf, as clearly shown in Figure 4. As the scale descends over the shelf, it is crowded out slightly by the cam surface 19a of a ledge projection 19b, so as to trip the same when the scale actually assumes the position on the shelf. The ledge 19b thus forms a retainer for the scale to prevent the same from accidentally leaving the shelf. Of course, the shelf and the ledge are so spaced that there is a slight amount of play to prevent the scale from binding between them. Adjacent to the shelf 19 the thickened portion 17 is cut away to define an acute shoulder 20, which serves as a pointer opposite the edge of the scale 14 to make the reading or setting thereof easy.

The above description covers the construction of the novel instrument, from which it will be apparent that the structure is of an exceedingly simple character. While the jaws or working end of the caliper is on standard lines, the novel handle formed by the grouped extensions 12 and 13, as indicated in Figure 1, serves as a firm base or holder, which is also of a compact nature.

While calipers have been constructed with measuring scales in the prior art, I claim that the design of my caliper is a departure of a radical character. It will be seen that the scale when not in use is closely folded within the handle portion of the caliper, so that it does not project or hinder the handling of the instrument. Yet, to put the scale into use, all that need be done is to swing the same over to place the scale in line with the offset 18, which forms a backing for the scale so as to assure the seating thereof on the shelf 19. Once the scale is on the shelf, no attention need be paid to the care thereof, as it cannot become dislodged or deviate in any other way from the position in which it is placed. The hands may therefore be fully used for the handling of the caliper itself and of the object to be measured if necessary. While observing the measurements, the pointer 20 forms an exact point for readings, and being of an integral nature with the extension 13, cannot vary or get out of order. The readings on the scale in Figure 4 have been shown inverted, this being for the reason that the caliper is usually viewed from above and the jaws applied below, so that the readings would obviously be more convenient in the position shown. When the use of the caliper has ceased, it is an easy matter to swing the scale back to the position alongside the handle extension 12 and to close the caliper as shown in Figure 1, in which case the lug 16 forms a stop for the handle extension 12, as previously mentioned.

In conclusion, it may be said that the novel instrument forms a simple, rugged and efficient medium for the taking of measurements in shops, laboratories, factories, and in other places where it is desirable that measurements shall be accurate, rapid and devoid of undue effort.

While I have illustrated and described my invention in the preferred form, it will be seen that the same is capable of many minor changes and refinements, and it is my intention to claim such changes and refinements as coming within the spirit and scope of the appended claims.

I claim:—

1. A caliper comprising pivoted jaws, extensions of the latter beyond the pivot, a pivoted scale bar carried by one of the extensions and swingable upon the other extension, an offset made from the latter to clear the scale-bar, and a shelf defined by said offset and forming a seat for said scale bar.

2. A caliper comprising pivoted jaws, extensions of the latter beyond the pivot, a pivoted scale bar carried by one of the extensions and swingable upon the other extension, an offset made from the latter to clear the scale bar, and forming a seat for the scale bar, and an acute pointer adjacent the seat.

In testimony whereof I affix my signature.

CHARLES LARSON.